United States Patent
Lefebvre et al.

(10) Patent No.: US 7,349,149 B2
(45) Date of Patent: Mar. 25, 2008

(54) DOUBLY-RESONANT OPTICAL PARAMETRIC OSCILLATOR WITH CORRESPONDING PUMP RECYCLING

(75) Inventors: Michel Lefebvre, Orsay (FR); Aude Desormeaux, Versailles (FR); Emmanuel Rosencher, Bagneux (FR)

(73) Assignee: Office National d'Etudes Et de Recherches Aerospatiales (Onera), Chatillon (FR)

( * ) Notice: Subject to any disclaimer, the term of this patent is extended or adjusted under 35 U.S.C. 154(b) by 0 days.

(21) Appl. No.: 11/587,079

(22) PCT Filed: Feb. 23, 2005

(86) PCT No.: PCT/FR2005/000418

§ 371 (c)(1),
(2), (4) Date: Oct. 19, 2006

(87) PCT Pub. No.: WO2005/111711

PCT Pub. Date: Nov. 24, 2005

(65) Prior Publication Data

US 2007/0223083 A1    Sep. 27, 2007

(30) Foreign Application Priority Data

Apr. 20, 2004    (FR) ................... 04 04128

(51) Int. Cl.
*G02F 1/39*    (2006.01)
(52) U.S. Cl. ........................ 359/330; 372/22

(58) Field of Classification Search ........ 359/326–330; 372/21–22
See application file for complete search history.

(56) References Cited

U.S. PATENT DOCUMENTS 6,751,010 B1 * 6/2004 Richter .................. 359/330
6,980,354 B1 * 12/2005 Smith et al. ............ 359/330

OTHER PUBLICATIONS

IEEE Journal of Quantum Electronics, Bjorkholm J E et al., Improvement of Optical Parametric Oscillators by Nonresonant Pump Reflection, vol. QE-6, No. 12. Dec. 1970, pp. 797-799.
IEEE Journal Of Quantum Electronics, Colucci G et al., Analysis of Integrated Optics Parametric Oscillators, vol. 28, No. 3, Mar. 1992, pp. 729-738.
Applied Physics-Letters, Yunping Wang et al., Highly efficient visible and infrared B-BaB2O4 optical parametric oscillator with pump reflection, 58(Apr. 8, 1991), No. 14, New York, US, pp. 1461-1463.

* cited by examiner

*Primary Examiner*—Hemang Sanghavi
(74) *Attorney, Agent, or Firm*—Blakely, Sokoloff, Taylor & Zafman (57) ABSTRACT

The oscillator comprises two resonant cavities in which a non-linear crystal (3) is situated. The incident pumping radiation $R_{pe}$ follows an emitting path across the crystal, the generated signal and complementary radiation carry out numerous emitted and return paths in the cavities, hence across the crystal and are thus converted into an inverse pumping radiation on the return paths thereof. According to the invention, a device (4) is incorporated in the oscillator for reflection of a fraction of the pumping radiation equivalent to the inverse pumping radiation in the absence of the device.

8 Claims, 6 Drawing Sheets

DOUBLY-RESONANT OPTICAL PARAMETRIC OSCILLATOR WITH CORRESPONDING PUMP RECYCLING

This is a non-provisional application claiming the benefit of International application number PCT/FR2005/000418 filed Feb. 23, 2005.

This present invention relates to doubly-resonant optical parametric oscillators with linear or folded geometry.

Optical parametric oscillators (OPOs) are frequency converters which, from a pulsed laser ray $\omega_p$ (pump), produce two new rays called the signal and complementary rays, with respective angles $\omega_s$ and $\omega_c$, such that $\omega_p = \omega_s + \omega_c$.

Parametric frequency conversion is achieved by causing the pump radiation to propagate through a component, generally a crystal that has a second-order optical non-linearity. If the physical parameters of the crystal, such as its temperature, its incidence in relation to the pump radiation or indeed the periodicity of its ferroelectric domains (such as the periodic return (cycling) in the case of a crystal such as lithium niobate) are modified, then the $\omega_s$ and $\omega_c$ values can be adjusted over a very wide range.

Thus, an OPO is a coherent light source, which offers a very wide range of spectral tuning, much greater than that of lasers. This essential characteristic opens many fields of application to the OPO, such as spectroscopic analysis of gases, remote detection, or the cooling of atoms for example.

In practice, the crystal is inserted into an optical resonator so that the rays involved complete a large number of passages through the crystal. The intensity of the pump radiation can then be converted efficiently to signal and complementary rays. A conversion efficiency of 30% is attained commonly.

Apart from their operation in continuous or pulse mode, the OPOs are classified into three categories called simply, doubly or triply resonant, according to whether the optical resonator allows a ray to oscillate either exclusively at the $\omega_s$ or $\omega_c$ angular frequencies, or two rays simultaneously at the $\omega_s$ and $\omega_c$ angular frequencies, or finally all three rays at angular frequencies $\omega_s$, $\omega_c$, and $\omega_p$. For the first two categories, the pump radiation can be applied to the crystal according to a double-passage geometry. The OPO is then described as simply or doubly resonant with pump recycling.

The increase in the number of rays oscillating in the resonator, and therefore passing through the crystal, leads to a significant reduction in the intensity of the pump radiation which must be applied to the crystal in order to compensate for the losses in the resonator.

This is why, with the doubly or triply resonant OPOs, a moderate intensity of pump radiation delivered by a laser of modest dimensions is satisfactory.

On the other hand, the spectral content generally becomes more difficult to control, and the operation of the doubly or triply resonant OPO can become unstable, depending on the characteristics of the pump radiation.

The use of resonators with double or triple cavities allows this problem to be overcome. The optical lengths seen by the different rays can be adjusted separately in this type of resonator and, as a consequence, the resonance frequencies or longitudinal modes of the different cavities can themselves also be adjusted. Thus, it has already been demonstrated [B. Scherrer, I. Ribet, A. Godard, E. Rosencher, M. Lefebvre, "Dual-cavity doubly resonant optical parametric oscillators—demonstration of pulsed single-mode operation", J. Opt. Soc. Am. B, vol. 17, No. 10, pp 1716-1729 (2000)], that, by Vernier effect, it is possible to produce, in a stable manner, an emission that has a pure spectrum, from a doubly resonant OPO with separate cavities. In addition, the resonators with multiple cavities allow continuous tuning of the frequency emitted by the OPO, by separately adjusting the lengths of each cavity.

Thus, the doubly resonant OPOs with separate cavities have two major advantages. Firstly, they have a controllable spectral content and, secondly, they have a low oscillation threshold. The oscillation threshold is conventionally defined as being the minimum intensity of the pump radiation which must be applied to the crystal in order to compensate for the losses in the resonator, and to attain parametric oscillation.

This type of OPO is implemented according to three geometries, namely in ring, folded or linear. As mentioned below, each geometry has its own advantages but also its limitations.

Historically, the first doubly resonant OPO with separate cavities was designed in a ring-type geometry [A. Ashkin, J. E. Bjorkholm, "Ring-type parametric oscillator", U.S. Pat. No. 3,628,182, (1971)] for which the three rays (pump, signal and complementary) pass through the crystal always in the same direction. This geometry allows a high conversion efficiency to be attained, in particular in the case of continuous-mode operation. However, the separation of the signal and complementary rays necessarily leads to the implementation of cavities of great length, for which the journey times of the rays within the resonator can be long, to the point of preventing operation in pulse working. In addition, ring-type geometry does not lend itself easily to the creation of compact and robust resources.

In folded or linear geometry, the signal and complementary rays make many two-way trips in the resonator, and therefore pass through the crystal in both directions, while the pump radiation propagates only in one direction. The signal and complementary cavities can have a common mirror [F. G. Colville, M. J. Padgett, M. H. Dunn, "Continuous wave, dual-cavity, doubly resonant, optical parametric oscillator", Appl. Phys. Lett. 64, 1490-1492 (1994)] or be totally decoupled [B. Scherrer, M. Lefebvre, "Monomode pulse optical parametric oscillator", patent EP 0855616]. This last configuration allows the parasitic couplings between the cavities to be limited, as these lead to large variations of the oscillation threshold of the OPO [D. Lee, N. C. Wong, Appl. Phys. B 66, 133-143 (1998)], these variations being highly penalising for the frequency tuning of the source.

Thus, linear geometry appears to be most appropriate for the creation of compact, monolithic sources with low production costs, since they can be produced in large quantities, using vertical production techniques initially developed for microelectronics [as an example, see L. Fulbert, E. Molva, P. Thony, "micro-laser pumped monolithic optical parametric oscillator", U.S. Pat. No. 5,754,333, (1998)].

Nevertheless, the implementation of linear cavities and more widely, of cavities operating with return (cycled) trips of the different rays (linear or folded geometries), has a major limitation which is associated with a process of re-conversion of the signal and complementary rays in a reverse pump radiation.

In general, the re-conversion process starts as soon as the signal and complementary rays pass through the non-linear crystal in the same direction only. This process therefore does not exist in the ring-type cavities, in which the three rays always travel in the same direction. On the other hand, in linear or folded geometry, the re-conversion always begins at each return of the signal and complementary rays.

This re-conversion process is disadvantageous in two ways. Firstly, by acting counter to the parametric conversion, it limits the yield of the OPO. Secondly, by producing a radiation, which propagates to the pump laser, it disturbs its operation if a sufficient optical isolation is not interposed.

It is possible to very considerably limit the harmful effect of the re-conversion process on the yield of the OPO by implementing a double-passage geometry in which all or part of the intensity of the pump radiation coming out of the crystal is reflected back to the crystal [J. E. Bjorkholm, A. Ashkin, R. G. Smith, 'Improvement of optical parametric oscillators by non resonant pump reflection', IEEE, J. of Quant. Electron., QE-6, No. 12, pp 797-799, (1970)]. The optimal yield of the OPO is then achieved when, at the output of the crystal, the following relation $$\phi_p - \phi_s - \phi_c = 0\ [2\ \pi] \tag{I}$$

is verified, where $\phi p$, $\phi s$ and $\phi c$ are respectively the phases of the pump radiation, signal and complementary recycling rays. In practice, it is therefore desirable that the expression $\phi_p - \phi_s - \phi_c$ should tend toward 0 mod $2\pi$. Theoretical analysis of the behaviour of the OPO, when operating in continuous mode, also shows that when relation I is verified, and when the entirety of the outgoing pump radiation is reflected, then the oscillation threshold of the OPO is reduced by a factor of 4, and the parametric gain width is reduced by about a factor of 2, which facilitates achievement of the longitudinal monomode operation described in EP 0855616. The gain width is conventionally defined as being the range of frequency in which parametric conversion can take place. The double passage of the pump radiation therefore enables the performances of the doubly resonant OPOs with linear or folded geometry to be increased very considerably. It is equally true that the pump radiation recycled to the pump laser remains a major limitation.

Thus, from the previous analysis, it emerges that the doubly resonant OPOs designed according to the geometries of previous designs are not fully satisfactory.

This present invention aims to create robust and compact doubly-resonant optical parametric oscillators that have a reduced re-conversion process, while also having a low recycled pump radiation whatever the mode of operation—continuous or pulse.

A doubly-resonant optical parametric oscillator according to the invention includes a non-linear crystal, an incoming pump radiation that makes a single forward journey through the crystal and emerges from the latter via its rear face, a signal radiation and a complementary radiation that make many two-way trips through the crystal, with these last two rays reconverting into a reverse pump radiation during their return journeys through the crystal, and a device that reflects a fraction of the intensity of the pump radiation coming out of the rear face of the crystal so that, at the output of the crystal, the phase relation $\phi_p - \phi_s - \phi_c = 0\ [2\pi]$ is verified. This oscillator is characterised in that the reflected fraction of the intensity of the pump radiation is close to or even equal to the intensity of the reverse pump radiation in the absence of the reflecting device. This fraction is called matched pump recycling.

Thus a laser delivers the incoming pump radiation into the crystal of the OPO, which produces both signal and complementary rays in two separate cavities, arranged according to a linear or folded geometry of previous design. Downstream of the crystal, the said device allows the reflection, with an adjustable phase, of a fraction of the intensity of the pump radiation coming out of the crystal. The optimum fraction of the intensity of the pump radiation coming out of the crystal is such that it is equal or at least close to the intensity of the pump radiation which would be produced, by re-conversion in the crystal of the signal and complementary rays during their return journeys, in absence of the device.

The optimal yield of the OPO according to the invention occurs when, at the output of the crystal, the phases of the return rays verify relation (I).

The intensity of the return pump radiation in the direction of the laser is then minimum, and the maxima of the intensity in the crystal, caused by interference between the field of the incoming pump radiation and the fields of the reflected pump radiation, are reduced.

The matched pump recycling of the OPO can be obtained by Fresnel reflection on an optical surface. This surface can be exempt from any optical treatment. It therefore has low production costs.

The rear face of the crystal can perform the matched pump recycling. In this case, the crystal is made from a material with variable optical length, in order to be able to adjust the phase of the matched pump recycling.

In one implementation variant, the device of the invention includes a disk, made from a material with variable optical length, whose rear face is partially reflective to the outgoing pump radiation.

According to this implementation, the disk can form a single block with the crystal. The flat front and rear faces of this disk can be other than parallel, in order to optically decouple the cavities of the signal and complementary rays.

Thus, the matched pump recycling geometry proposed in the invention enables the performance of the doubly resonant OPOs with linear or folded geometries to be improved considerably without introducing the faults that are inherent in the double-passage geometries of previous designs.

Other characteristics and advantages of the invention will emerge from the description that follows and the non-limiting implementation examples.

The appended drawings illustrate the invention

Figure 1:
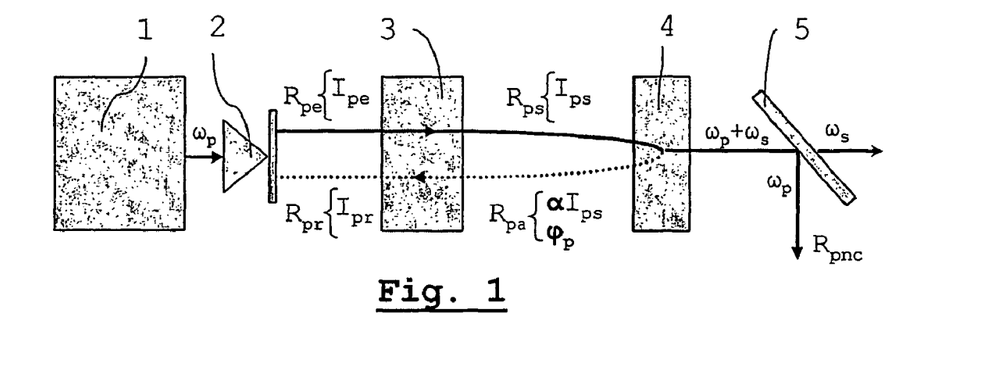
FIG. 1 schematically shows the implementation of the invention.

The invention is based on a geometry said to have matched pump recycling. FIG. 1 presents a general implementation diagram of this. At the output of an optical isolator 2, a pump laser 1 with phase angle $\phi_p$ delivers an incoming pump radiation $R_{pe}$, with an intensity of $I_{pe}$, which passes through a doubly resonant OPO 3 designed according to a linear or folded geometry of previous design. At the output of the OPO, a device 4 allows the reflection, with an adjustable phase $\phi_p$, a fraction α of the intensity $I_{ps}$ of the pump radiation $R_{ps}$ exiting from the rear face of the crystal. The signal radiation at phase angle ωs is available at the end of the chain, after being filtered from the unconverted pump radiation $R_{pnc}$ by means of the blade 5. The invention is characterised in that the device 4 allows reflection of a fraction α of the intensity $I_{ps}$ of the pump radiation ($R_{ps}$) exiting from the crystal, such that the intensity $I_{ps}$ is close to, or even equal to that of the reverse pump radiation which would be produced by re-conversion of the signal and complementary return rays in the crystal of the OPO, in the absence of the device. The optimal yield of the OPO is obtained when the reflected pump radiation $R_{pa}$ opposes the re-conversion process both in amplitude and in phase, and therefore when $\phi_p$ satisfies relation (I).

During operation, the phase angle $\phi_p$ of the reflected pump radiation can be adjusted and held automatically at its optimum by using a conventional control loop of the PID type (proportional, Integral, Derivative), not shown in the diagram of FIG. 1.

Figure 2:
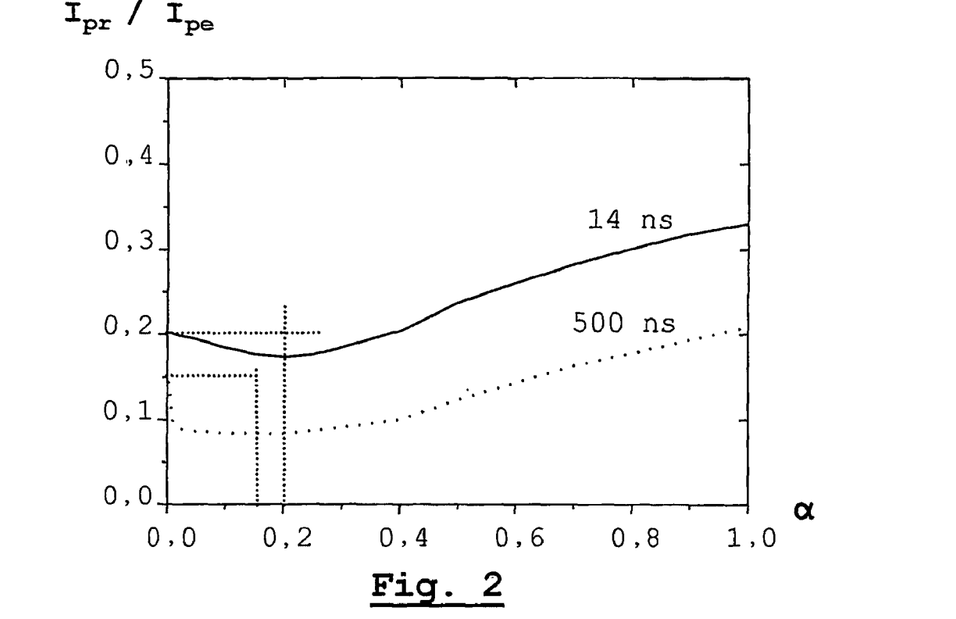
FIGS. 2, 3 and 4 present the graphs that highlight the conditions required in order to optimise the matched pump recycling that is the subject of the invention.
Figure 3:
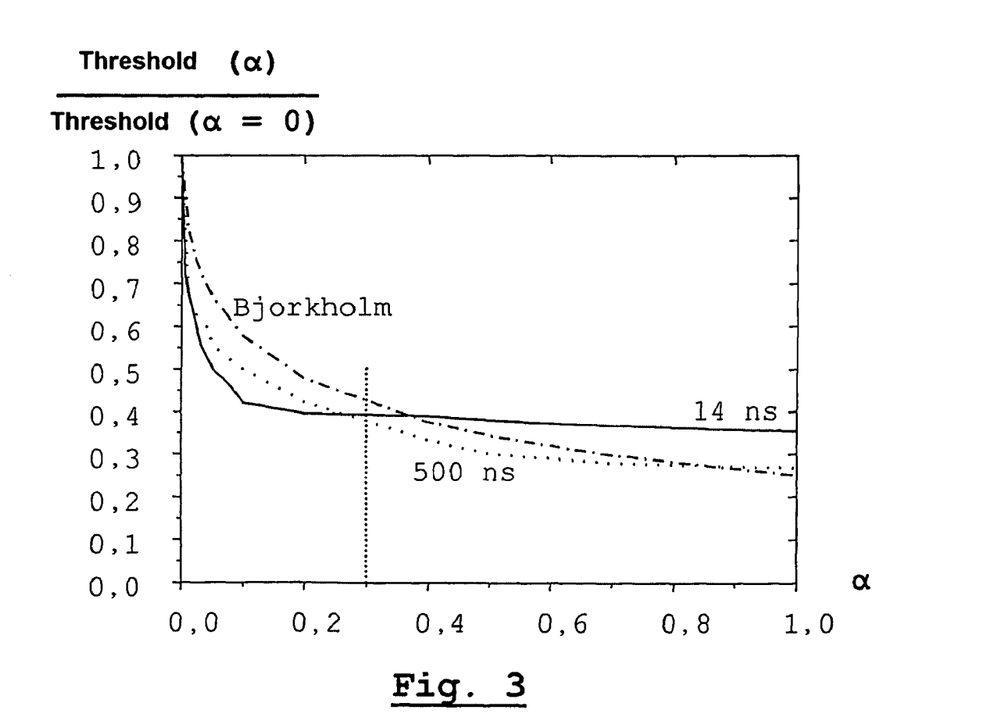

FIGS. 2 and 3 show in detail the particular implementation conditions of the invention. The graphs presented are the result of a digital modelling of the behaviour of a doubly resonant OPO designed according to a linear geometry. The theoretical evolutions are calculated according to a digital method [C. Drag, I. Ribet, M. Jeandron, M. Lefebvre, E. Rosencher, "Temporal behaviour of a high repetition rate infrared optical parametric oscillator based on periodically polled materials", Appl. Phys. B, 73, pp 195-200, (2001)] after introducing the influence of pump recycling for the phase condition of relation (I). The intensity $I_{pe}$ Of the incoming pump radiation ($R_{pe}$) is fixed, and equal to three times that which would reach the oscillation threshold, so that a high conversion efficiency is guaranteed while still maintaining a good radiation quality. The simulations are carried out in the context of a pulse operation, but for pulses of the pump radiation of very different lengths (14.5 and 500 ns) in order to specify the dependence of the intensity $I_{pr}$ of the return pump radiation $R_{pr}$ sent back to the laser as a function of the fraction α of the reflected pump radiation both in pulse working and in semi-continuous working. Between the two end values of this fraction α, the first for α=0, where the intensity $I_{pr}$ is equal to the intensity of the reverse pump radiation created by the re-conversion process, and *the second for α=1, where the intensity $I_{pr}$ increases due to the reflection of the exiting pump radiation, the function passes through a minimum. The latter is obtained for α=0.2 for pulses of the pump radiation of 14 ns and α=0.15 for pulses of the pump radiation of 500 ns. By observing that for the first end value a=0, $I_{pr}/I_{pe}$=0.2 for pulses of the pump radiation of 14 ns, and $I_{pr}/I_{pe}$=0.15 for pulses of the pump radiation of 500 ns, it is thus confirmed that the intensity of the pump radiation sent back to the laser is minimum when the reflected intensity fraction is comparable to that produced by re-conversion in the OPO without return of the pump radiation. FIG. 2 also shows that the longer the pulses of the pump radiation, the wider the return range of minimum pump radiation. Thus, for pulses of pump radiation of 500 ns, it is necessary only to maintain the value of a between 0.1 and 0.3 so as to perform correct matching of pump recycling.

FIG. 3 presents the changes in the oscillation threshold of the OPO as a function of the fraction of the pump radiation reflected. As previously, the calculations are performed for pulses of the pump radiation with lengths of 14.5 and 500 ns. In addition, the evolution to continuous regime obtained from relation 6 of [J. E. Bjorkholm, A. Ashkin, R. G. Smith, 'Improvement of optical parametric oscillators by non resonant pump reflection', IEEE, J. of Quant. Electron., QE6, No. 12, pp 797-799, (1970)] is presented. This figure shows clearly that a reflection of 10 to 30% of the pump radiation is enough to reduce the oscillation threshold to a significant degree. Thus, for α=0.3, the oscillation threshold is reduced by a factor of 2.5 in relation to an arrangement without return pump radiation. Beyond α=0.3, the value of the oscillation threshold varies little with α, whatever the length of the pulses the pump radiation.

Figure 4:
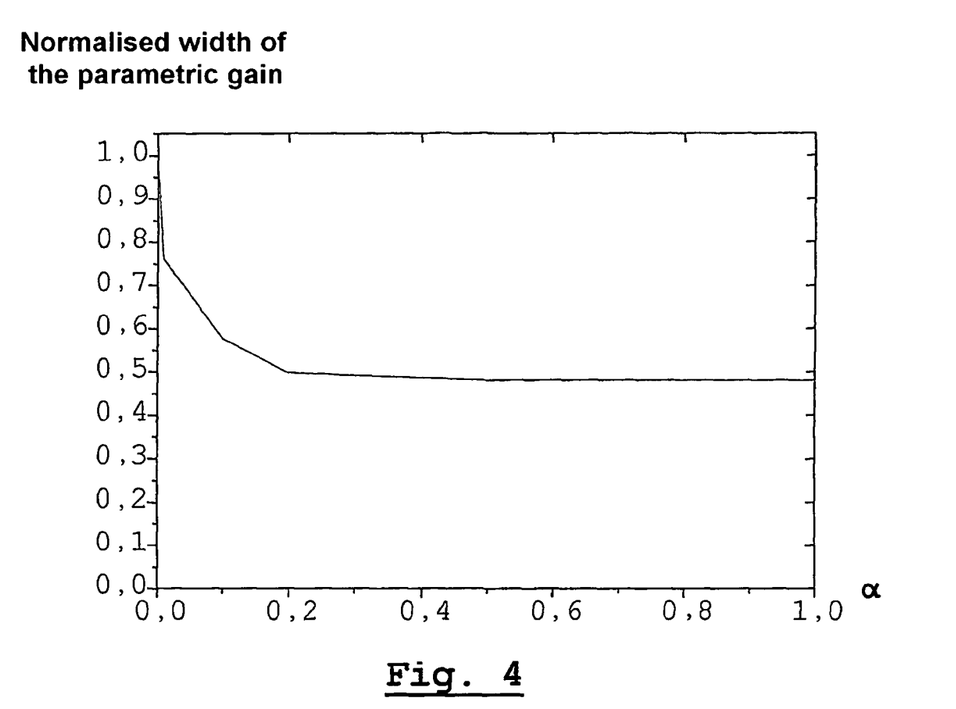

It should be noted that this range of values of α between 0.1 and 0.3 also allows the reduction to a significant degree of the parametric gain width, as illustrated in FIG. 4, which shows the evolution of this gain width as a function of the parameter α for continuous pump radiation. FIG. 4 shows clearly that for values of α greater than 0.3, the gain width no longer changes.

From the previous analysis, it emerges that the operation of the doubly resonant OPOs with linear or folded cavity is particularly improved by the presence of device 4, which reflects, at the cavity output, a fraction of the pump radiation of between 10 and 30%, comparable to the intensity of the pump radiation which would be created by re-conversion, in the absence of return pump radiation. Contrary to the double-passage geometries of previous designs, where the entirety of the radiation is re-used [A. Bandilla, W. Brunner, R. Fischer, H. Paul, "Device to reduce the pumping energy in the case of optical parametric oscillators", patent FR 2 093 928, 1971], the matching in phase and in intensity of the return pump radiation proposed in the invention is particularly advantageous, since it allows one:

to reduce the intensity of the return pump radiation in the direction of the laser and as a consequence to dispense with the need for a reinforcement of the level of optical isolation between the laser 1 and the OPO 3;

to not create, by interference between the go and return pump fields, maxima of intensity that can be intense locally, to the point of damaging the crystal or the optical processes;

to use the Fresnel reflection of an optical surface that is exempt from any optical treatment and therefore has a low production cost.

to increase the continuous tuning range in longitudinal monomode operation, as presented in EP 0855616.

Figure 5:
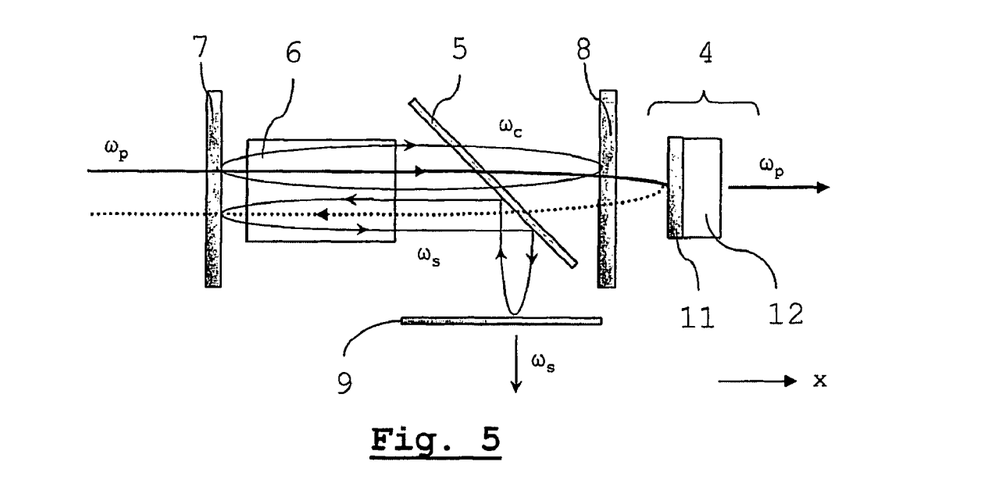
FIG. 5 relates to an implementation of the invention in the folded geometry of previous design.

FIG. 5 illustrates an implementation of the invention for a folded geometry of previous design. The blade 5, inserted into the resonator of the OPO, is used to separate the signal and complementary rays so that they oscillate respectively between pairs of mirrors (7, 9) and (7, 8). The pump radiation is introduced through mirror 7 before passing through the crystal 6 placed in the part common to the two cavities. The signal radiation is available at the output of the mirror 9, partially reflecting at the phase angle $\omega_s$. This arrangement offers the possibility of placing the device 4 at the output of the mirror 8 which is reflecting at ωc and totally transparent to $\omega_p$. In this way, the insertion of the device 4 does not interact with the signal and complementary rays. The device 4 includes a piezoelectric spacer 12 attached to a blade that is coated by dielectric treatment 11 and intended to reflect a fraction α of about 0.2 times the pump radiation exiting from the crystal. By controlling the piezoelectric spacer 12 with a suitable electrical resource, it is possible to finely modify the position of the element 11 on axis x, and thus to adjust the phase $\phi_p$ of the matched pump recycling in order to be able to achieve the phase relation (I).

Figure 6:
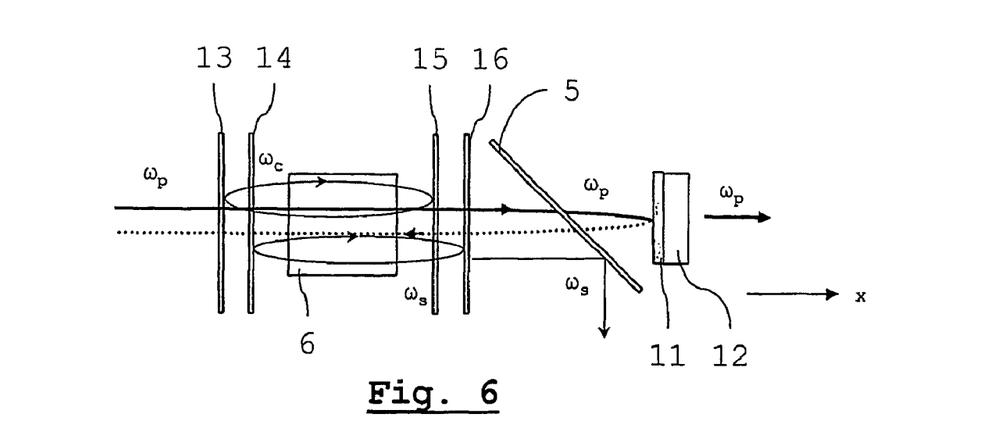
FIG. 6 relates to an implementation of the invention in the linear geometry of previous designs, with filtering of the signal radiation at the output of the optical parametric oscillator.

The arrangement of FIG. 6 relates to a linear geometry with interleaved cavities as described in EP 0855616. The crystal 6 is inserted into the part common to the two cavities formed by the pairs of mirrors (13, 15) and (14, 16), and all of these mirrors are transparent to $\omega_p$. Mirrors 13 and 15 are totally reflecting at $\omega_c$, and mirror 15 is transparent at $\omega_s$. On the other hand, mirror 14 is totally transparent at $\omega_c$ and reflecting at $\omega_s$. The signal radiation is extracted through the mirror 16, which is partially reflecting at $\omega$s. The separation between the signal radiation and the unconverted pump radiation is achieved by means of the blade 5 which is inserted between the output of the OPO and all of the elements 11 and 12 which perform, as previously, the phase matched recycling of a fraction of the pump radiation.

Figure 7:
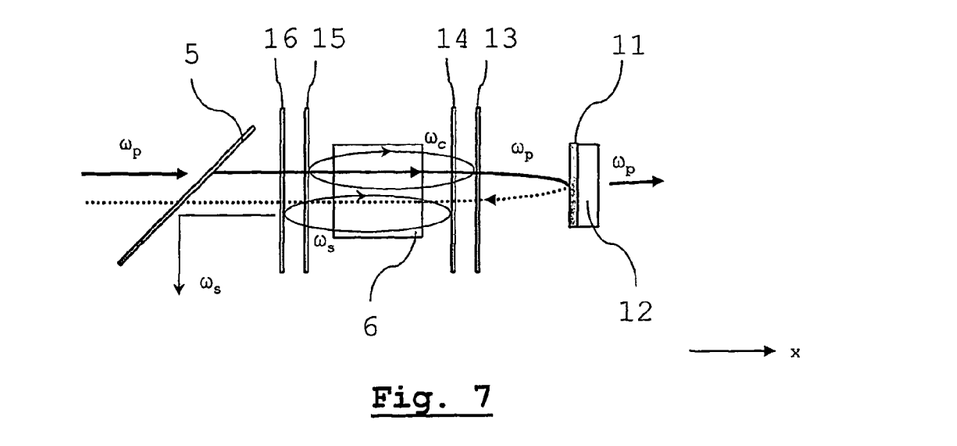
FIG. 7 relates to an implementation of the invention in the linear geometry of previous designs, with filtering of the signal radiation at the input of the optical parametric oscillator.

As illustrated in FIG. 7, the implementation of the invention extends immediately to an arrangement in which the signal is extracted through the mirror 16, which this time is placed at the input to the resonator. The separating blade 5 is then placed in the path of the pump radiation before passing through the non-linear crystal. This configuration has the advantage of being able to reduce the distance separating the mirror 13 from the face 11 and thus of rendering the source assembly more compact and therefore more robust. Note nevertheless that the matching in phase and in amplitude of the pump radiation is particularly useful here since, without this matching, the re-conversion effect would be particularly great because of the fact that, on the return through the crystal, the signal and complementary rays are present in their entirety.

Figure 8:
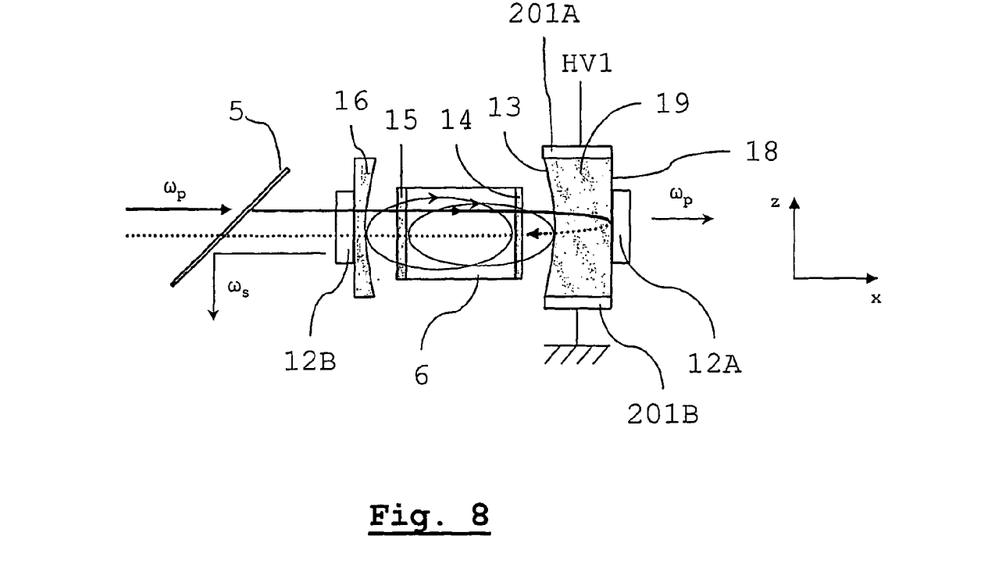
FIG. 8 illustrates an implementation of the invention in semi-monolithic linear geometry, with cavities that are totally decoupled for the signal and complementary rays.

FIG. 8 presents a semi-monolithic implementation of the invention. With a view to compactness, the mirrors 14 and 15 are deposited directly on the external faces of the non-linear crystal. The latter can be made of periodically poled lithium niobate (PPLN). Each external mirror 13 and 16 is held by a piezoelectric spacer (respectively 12A and 12B) or a microsystem of the MEMS (micro electromechanical system) type used to electrically adjust the lengths of each optical cavity. The partial recycling of the pump radiation is performed by the rear face 18 of the disk 19 coated onto the front face by a mirroring process 13. The device is characterised here by the fact that the wanted function is performed by Fresnel reflection on the rear face 18 of a disk 19 in optoelectric material, having received no optical treatment. The unreturned lithium niobate can advantageously be chosen to obtain a reflection coefficient of 14%, which is compatible with the wanted value $0.1<\square<0.3$ without producing any parasitic parametric conversion in the disk 19. Two electrodes 201A and 201B are arranged on either side of the disk 19, on its crystallographic axis c the z axis of FIG. 8). A voltage HV1 applied between these electrodes creates an electric field on this same axis. The effect of the electric field is to modify the thickness of the disk 19 on the x axis of the figure, and therefore the optical length travelled by the pump radiation. The thickness of the disk 19 between the mirror 13 and the rear face 18 is typically 6 mm, in order to be able to modify the optical length travelled by the pump radiation by a sufficient amount, namely about 1 μm for a go and return on the x axis of the crystal indicated in FIG. 8. The electric field to be applied is then moderate, of the order of 0.5 kV/mm. Adjustment of the phase of the radiation return is achieved by varying the optical length travelled by the pump radiation by means of the voltage HV1 applied between electrodes 201A and 201B. The frequency tuning of the OPO is achieved by modifying the position of the mirrors 13 or 16 by means of the piezoelectric spacers (respectively 12A and 12B). The voltage HV1 applied between the electrodes 201A and 201B is then readjusted in order to maintain the phase matching of the radiation return.

Figure 9:
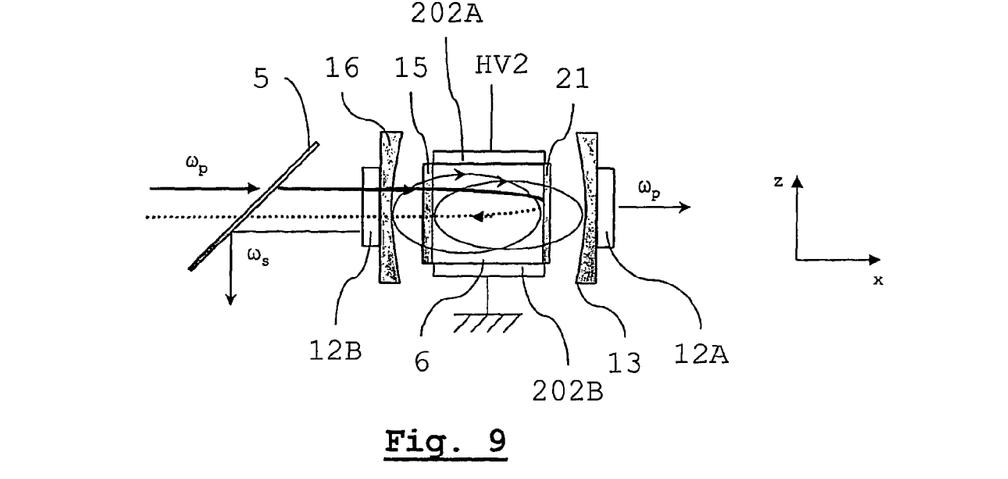
FIG. 9 presents an implementation of the invention for which the non-linear crystal performs the double parametric conversion function and matching of the pump recycling.

FIG. 9 presents a configuration in which the non-linear crystal 6 performs the double function of parametric conversion and pump recycling that is matched in both phase and intensity. With this objective, the output face of the crystal is coated by an optical process 21 which allows the reflection typically of 20% of the intensity of the pump radiation, while still being fully reflective to the signal radiation and totally transparent to the complementary radiation. In addition, the crystal is inserted between two electrodes 202A and 202B, arranged on either side on its crystallographic axis c, to which an electric voltage HV2 is applied, this being used to modify the length of the crystal by optoelectric effect and thus to achieve the phase matching of the partially reflected pump radiation. This configuration has two advantages. Firstly it reduces the number of optical processes necessary for the implementation of the invention. Secondly, it is not very constraining in relation to the specifications of the treatment 21, since it is enough that the reflection of this mirror is between 10 and 30% in order to achieve the return of the intensity-matched pump radiation.

Figure 10:
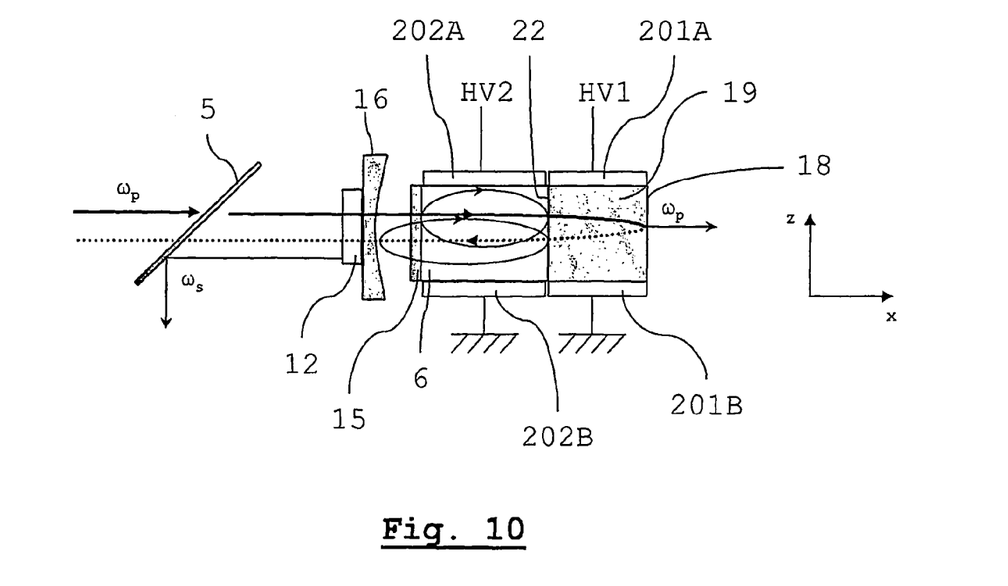
FIG. 10 presents an implementation of the invention in semi-monolithic linear geometry with a common mirror for the signal and complementary rays.

In FIG. 10, the output face of the crystal 6 is coated by an optical process 22, and used to reflect the signal and complementary rays while still providing maximum transmission for the pump radiation. This arrangement enables the number of optical processes necessary for the creation of the source to be reduced, thus reducing its production cost. Implementation of the invention according to the diagram of FIG. 10 is characterised by the use of an optoelectric disk 19 deposited directly on the crystal using the adhesive and affixing techniques known from previous designs. As previously, matched pump recycling is performed by Fresnel reflection on the face 18 of the optoelectric disk 19. The application of an electric voltage HV1 between the electrodes 201A and 201B allows the phase of the recycled radiation to be adjusted. Similarly, varying the length of the complementary cavity is achieved here by optoelectric effect on the crystal itself, by applying a voltage HV2 between the electrodes 202A and 202B. The piezoelectric spacer 12 is used to adjust the length of the cavity signal, separately and over a wide range. In this way, it is possible to continuously tune the frequency of the signal radiation available at the output of the OPO.

Figure 11:
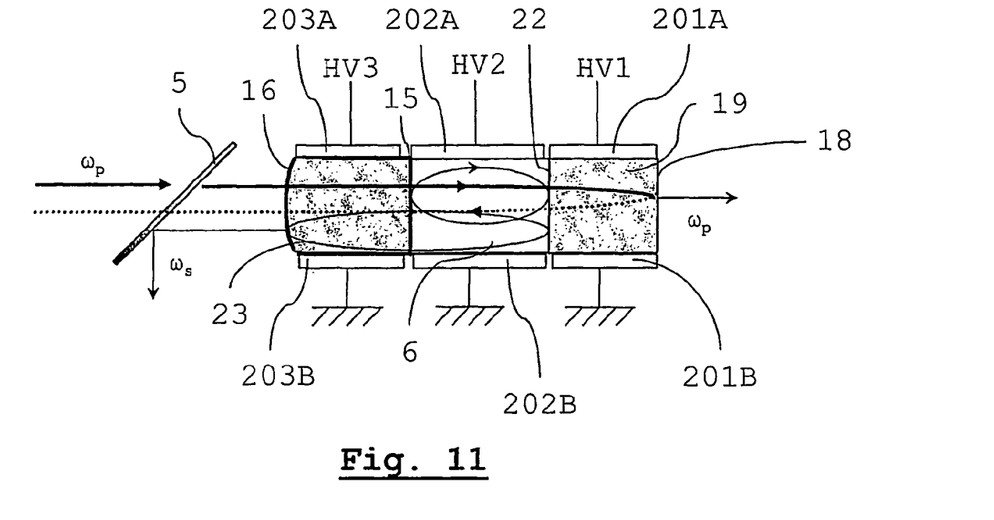
FIGS. 11 and 12 illustrate implementations of the invention in entirely monolithic linear geometry.
Figure 12:
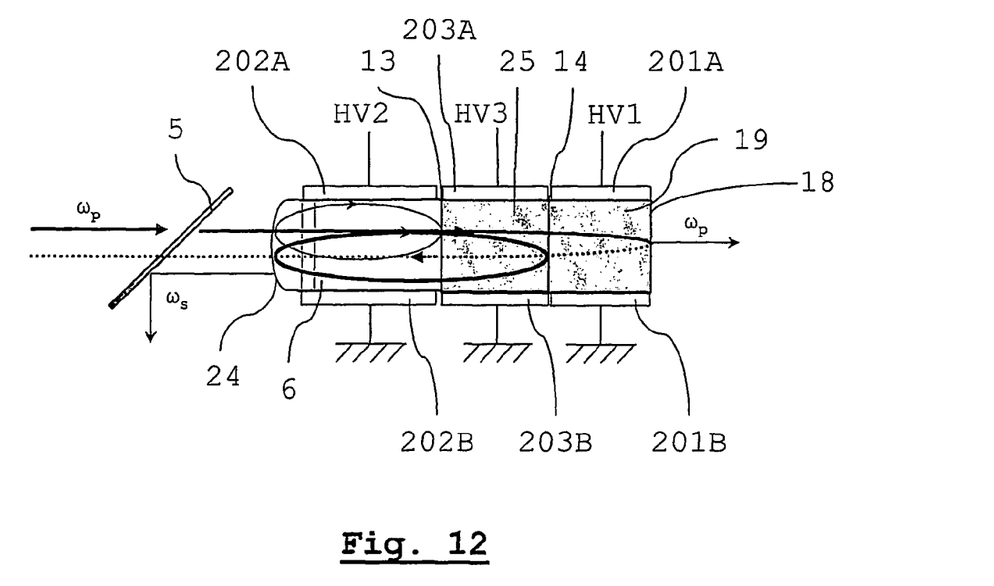

FIGS. 11 and 12 illustrate the entirely monolithic arrangements in which the length variations are achieved by optoelectric effect only, by applying voltages HV1, HV2 and HV3 to electrodes 201A and 201B, 202A and 202B, and 203A and 203B respectively. Given the small variations of length and therefore of frequency variations achieved by optoelectric effect, the use of a pump laser that is easy to tune in frequency, such as a fibre laser, can prove to be particularly advantageous if a very wide range of spectral tuning is sought.

In the arrangement shown in FIG. 11, the signal and complementary rays oscillate between the pairs of mirrors (16, 22) and (15, 22) respectively, with the non-linear crystal 6 being inserted between two optoelectric disks 19 and 23. In order to facilitate the practical creation of the source, the surface of mirrors 15 and 22 is preferably flat while mirror 16 can be concave. In this configuration, only the signal cavity is optically stable, and the spatial mode of the complementary cavity is then a function of the transverse distribution of the pump radiation. Given that both signal and complementary cavities have a common flat mirror 22, the oscillation of the two rays necessarily occurs on the same axis. It is therefore wise to devote particular attention to the quality of the optical processing, in order to prevent parasitic coupling between the two cavities.

The creation of stable cavities for the two rays, having a reduced sensitivity to parasitic coupling, can be achieved by following the arrangement of FIG. 12, in which the signal and complementary rays oscillate between the pairs of mirrors (24, 14) and (24, 13), respectively). In order to conserve flat surfaces at the various internal interfaces, the optoelectric disks 19 and 25 are now places on the same side of the crystal 6. The face 24 of the crystal 6 is partially reflective to the signal radiation in order to perform the coupling to the drive output. In addition, this face 24 is chosen to be concave so that both signal and complementary cavities are optically stable. Given the concavity of item 24, oscillation can be achieved by setting a slight angle (typically 0.1°) between surfaces 13, 14 and 18, which allows the signal and complementary cavities to be decoupled. This mode of operation is therefore characterised by the use of an optoelectric and slightly prismatic disk 19 and 25.

The invention claimed is:

1. A doubly-resonant optical parametric oscillator (5) that includes a non-linear crystal, an incoming pump radiation that makes a single forward journey through the crystal and emerges from the latter by its rear face, a signal radiation and a complementary radiation that make many two-way trips through the crystal, with these last two rays reconverting into a reverse pump radiation during their return journeys through the crystal, a device that reflects a fraction of the intensity of the pump radiation coming out of the rear face of the crystal so that, at the output of the crystal, the phase relation $\phi_p - \phi_s - \phi_p = 0 \ [2\pi]$ is verified, where $\phi_p$ and $\phi_s$ are the phases of the pump radiation, characterised in that the reflected fraction of the intensity of the pump radiation, called matched pump recycling, is close to or even equal to the intensity of the reverse pump radiation in the absence of the reflecting device.

2. An optical parametric oscillator according to claim (1), characterised in that the fraction ($\alpha$) of the intensity of the pump radiation coming out of the rear face of the crystal ($I_{ps}$) is between 0.1 and 0.3.

3. An optical parametric oscillator according to claim 1, characterised in that the device includes an optical surface (1), operating by Fresnel reflection, and exempt from any optical treatment.

4. An optical parametric oscillator according to claim 1, characterised in that the device includes the rear face of the crystal (6).

5. An optical parametric oscillator according to claim 1, characterised in that the non-linear crystal is created from a material with a variable optical length.

6. An optical parametric oscillator according to claim 1, characterised in that the device includes a disk made from a material with variable optical length, whose rear face is partially reflective to the pump radiation.

7. An optical parametric oscillator according to claim 6, characterised in that the disk forms a single block with the crystal.

8. An optical parametric oscillator according to claim 7, characterised in that the front and rear faces of the disk are not parallel.

* * * * *